(12) United States Patent
Vanstone et al.

(10) Patent No.: US 8,359,469 B2
(45) Date of Patent: Jan. 22, 2013

(54) ONE WAY AUTHENTICATION

(75) Inventors: Scott A. Vanstone, Campbellville (CA); Sherry E. Shannon-Vanstone, Campbellville (CA)

(73) Assignee: Certicom Corp., Mississauga, Ontario (CA)

( * ) Notice: Subject to any disclaimer, the term of this patent is extended or adjusted under 35 U.S.C. 154(b) by 0 days.

(21) Appl. No.: 13/315,509

(22) Filed: Dec. 9, 2011

(65) Prior Publication Data

US 2012/0089844 A1    Apr. 12, 2012

Related U.S. Application Data

(63) Continuation of application No. 11/542,106, filed on Oct. 4, 2006, now Pat. No. 8,095,792, and a continuation of application No. PCT/CA2005/000180, filed on Feb. 14, 2005.

(60) Provisional application No. 60/543,914, filed on Feb. 13, 2004.

(51) Int. Cl.
    *H04L 9/00*    (2006.01)
(52) U.S. Cl. ........... 713/168; 713/150; 713/170; 726/26
(58) Field of Classification Search .................. None
    See application file for complete search history.

(56) References Cited

U.S. PATENT DOCUMENTS

| | | | |
|---|---|---|---|
| 1,754,696 A | 4/1930 | Sauls | |
| 1,797,505 A | 3/1931 | Jones et al. | |
| 2,272,529 A | 2/1942 | Larson | |
| 5,535,276 A | 7/1996 | Ganesan | |
| 5,887,925 A | 3/1999 | Arterbury et al. | |
| 6,446,207 B1 | 9/2002 | Vanstone et al. | |
| 6,665,530 B1 | 12/2003 | Broyles et al. | |
| 7,302,572 B2 | 11/2007 | Shinriki et al. | |
| 8,095,792 B2* | 1/2012 | Vanstone et al. | ............ 713/168 |
| 2003/0194086 A1 | 10/2003 | Lambert | |
| 2005/0022009 A1 | 1/2005 | Aguilera et al. | |
| 2005/0123142 A1 | 6/2005 | Freeman et al. | |

FOREIGN PATENT DOCUMENTS

| | | |
|---|---|---|
| FR | 2842967 | 1/2004 |
| JP | 61-77440 | 4/1986 |
| JP | 6-43809 | 2/1994 |
| JP | 11-174957 | 7/1999 |
| JP | 2000-078128 | 3/2000 |
| JP | 2002-281019 | 9/2002 |

OTHER PUBLICATIONS

Schneier, B.; Applied Cryptogaphy: 1990: p. 38; J. Wiley: New York.
Martin, W.C.; "Message Replay Prevention Using a Previously Transmitted Random Number to Sequence the Messages"; IMB Technical Disclosure Bulletin: Aug. 1, 1984; vol. 27, No. 3; IBM Corp.; New York.
Supplementary search report from European Patent Application No. 05714436 completed Nov. 26, 2008, received by applicant Dec. 16, 2008.

(Continued)

*Primary Examiner* — Ponnoreay Pich
(74) *Attorney, Agent, or Firm* — Dimock Stratton LLP; Etienne de Villiers

(57) ABSTRACT

A cryptosystem prevents replay attacks within existing authentication protocols, susceptible to such attacks but containing a random component, without requiring modification to said protocols. The entity charged with authentication maintains a list of previously used bit patterns, extracted from a portion of the authentication message connected to the random component. If the bit pattern has been seen before, the message is rejected; if the bit pattern has not been seen before, the bit pattern is added to the stored list and the message is accepted.

12 Claims, 3 Drawing Sheets

OTHER PUBLICATIONS

Aura, Tuomas; "Strategies against Replay Attacks"; Proceedings of the 10th Computer Security Foundations Workshop; Jun. 1997; pp. 59-68; Rockport, Massachusetts RSA Laboratories; PKCS #1 v1.5 RSA; RSA Cryptography Standard; Nov. 1, 1993.

Menezes, Alfred et al.; Handbook of Applied Cryptography; 1997; Chapter 10; pp. 417-420; CRC Press LLC.

Hankerson, Darrel et al.; Guide to Eliptic Curve Cryptography; 2004, Chapter 4, pp. 184-186; Springer-Verlag New York.

International Preliminary Report on Patentability from PCT/CA2005/000180 filed Feb. 14, 2005.

JPO Office Action in JP Patent Application No. 2006-552437, mailing date: Mar. 9, 2010 (with English translation).

* cited by examiner

ONE WAY AUTHENTICATION

CROSS-REFERENCE TO RELATED APPLICATIONS

This application is a continuation of International PCT Application No. PCT/CA2005/000180 filed on Feb. 14, 2005 which claims priority from U.S. Provisional Application No. 60/543,914 filed on Feb. 13, 2004 the contents of which are hereby incorporated by reference.

FIELD OF THE INVENTION

The present invention relates to cryptographic systems and protocols used in such systems. The present application is a continuation of U.S. application Ser. No. 11/542,106, filed Oct. 4, 2006, now issued as U.S. Pat. No. 8,095,792.

BACKGROUND OF THE INVENTION

In order to ensure confidentiality of or authentication of messages transferred between a pair of correspondents in a data communication system, it is usual to employ one or more cryptographic protocols to secure the message. Such protocols must be capable of withstanding a variety of attacks that may be made by an interloper in an attempt to break the protocol. One such attack is a replay attack. "Replay attacks" attempt to replicate an action performed by an earlier transmission to obtain information about the correspondents private information or keys used in the encryption by recording messages and reproducing the protocol at a later date.

DESCRIPTION OF THE PRIOR ART

Such attacks can be thwarted at the cost of added complexity to the protocol such as the use of nonces. However, in many situations, especially legacy operations, the addition of nonces to the protocol requires a significant change to the protocol and/or the data structure of the message, something often unacceptable with legacy systems. Such changes are especially problematic in legacy systems with a large deployed base of authentication tokens where such a change would require amendment of and redeployment of the tokens. A method is needed to prevent replay attacks which does not require changes to the established base.

It is therefore an object of the present invention to obviate or mitigate the above disadvantages.

In general terms, the invention utilises the presence of an identifiable random component generated during signing of a message for use in verification of the signature to verify the originality of a message and inhibit replay attacks in a protocol.

SUMMARY OF THE INVENTION

One aspect of the invention applies to signature schemes wherein the signature contains a random component, that is, a component that is derived from a randomly generated bit stream every time a signature is computed. To comply with the protocol, the signature must contain the random component. A portion of the component provides a bit pattern that may be used to inhibit a replay attack.

The entity charged with authentication maintains a list of bit patterns previously used by the sending correspondent and extracted from a portion of the signed message connected to the random component. If the bit pattern has been seen before, the message is not considered original and is rejected, i.e. it has previously been received; if the bit pattern has not been seen before and the signature verifies, the bit pattern is added to the stored list and the message is accepted.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
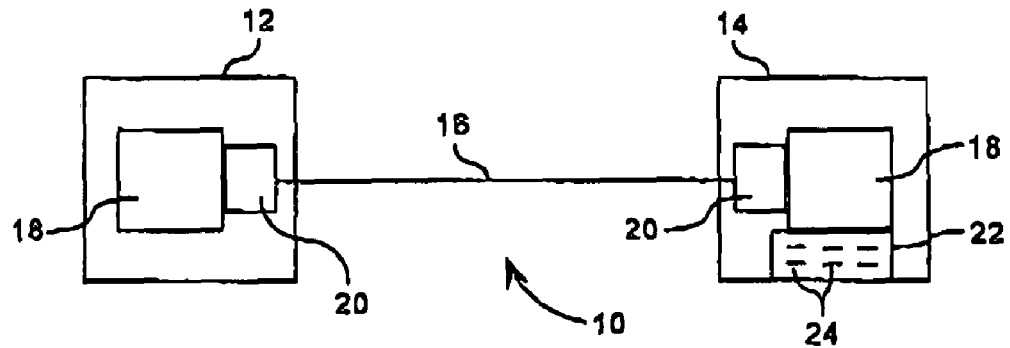
FIG. 1 is a schematic representation of a data communication system.
Figure 2:
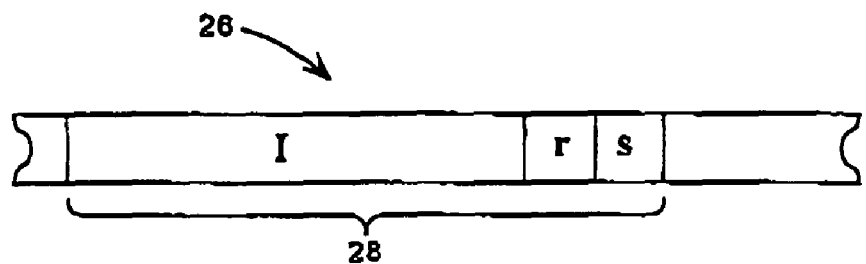
FIG. 2 is a schematic representation of a data stream representing a signed message.
Figure 3:
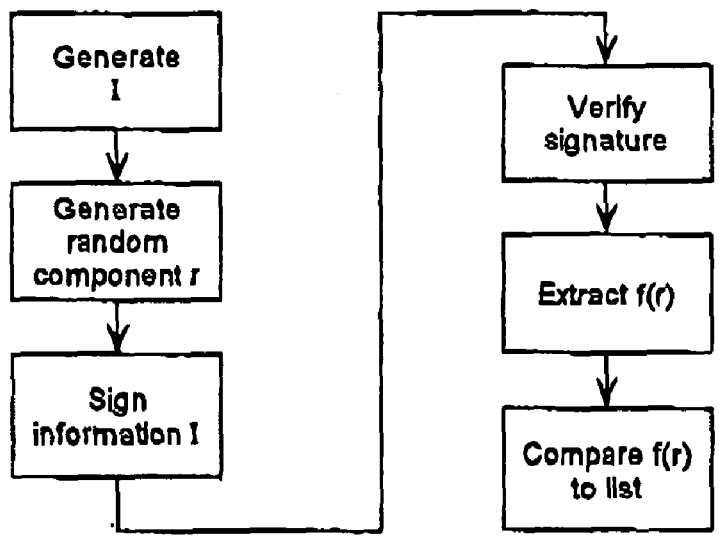
FIG. 3 is a schematic representation of the flow of information in the system shown in FIG. 1.

Referring therefore to FIG. 1, a data communication system generally indicated at 10 includes a pair of correspondents 12, 14 interconnected by a data communication link 16. Each of the correspondents 12, 14 includes a computing device 18 to implement a set of programmed instructions and an encryption module 20 to interface between the computing device 18 and communication link 16.

It will be appreciated that the correspondents 12, 14 may be general purpose computers or dedicated equipment in a client server relationship, such as a point of sale device, PDA or cell phone interfacing through the link 16 with a financial institution.

In operation, the computing device 18 prepares a message which is processed by the encryption unit 20 and transmitted as a data stream 26 through the communication link 16. The encryption unit 20 at the correspondent 14 processes the data stream to recover and authenticate the message received before passing it to the computing device 18.

The correspondent 14 includes a database 22 that contains lists 24 of bit patterns of selected portions of signatures received by the processor 20. The database 22 is accessible by the computing device 18 and the lists 24 are conveniently organised to conduct a comparison for a particular initiating correspondent 12 between the bit patterns in a message received and those that are contained in the database.

The encryption device 20 may implement a number of different protocols, such as a key generation, encryption/decryption or signature and verification. It will be assumed for the purpose of illustrating a preferred embodiment that the correspondent 12 prepares an information package in the computing device 18 which is signed by the encryption device 20. Upon receipt at the correspondent 14, the cryptographic processor 20 verifies the signature and passes the information to the computing device 18.

In operation, the correspondent 12 generates the information I in the computing device 18 and forwards it to the cryptographic processor 20. The processor 20 signs the information I, utilising a protocol that generates a random component r. The bits representing the information I and signature components including the random component are assembled in to a data stream 26 to represent a signed message 28.

The signed message 28 is transmitted over the link 16 as a data stream and is received by the cryptographic unit 20 at the correspondent 14. The signature is verified according to the signature scheme in the normal manner. If the verification is authenticated, the portion of the signed message corresponding to the random component r is located. The bit stream representing the portion is then compared with bit streams contained in the database 22 to ensure that the same random component has not been utilised in previous signed messages. If the bit stream has not been previously utilised, that is if no match is found in the database 22, then the signature is considered to be an original message, in that it has not been received before, and is accepted. If a match is found then the signed message is not accepted.

Figure 4:
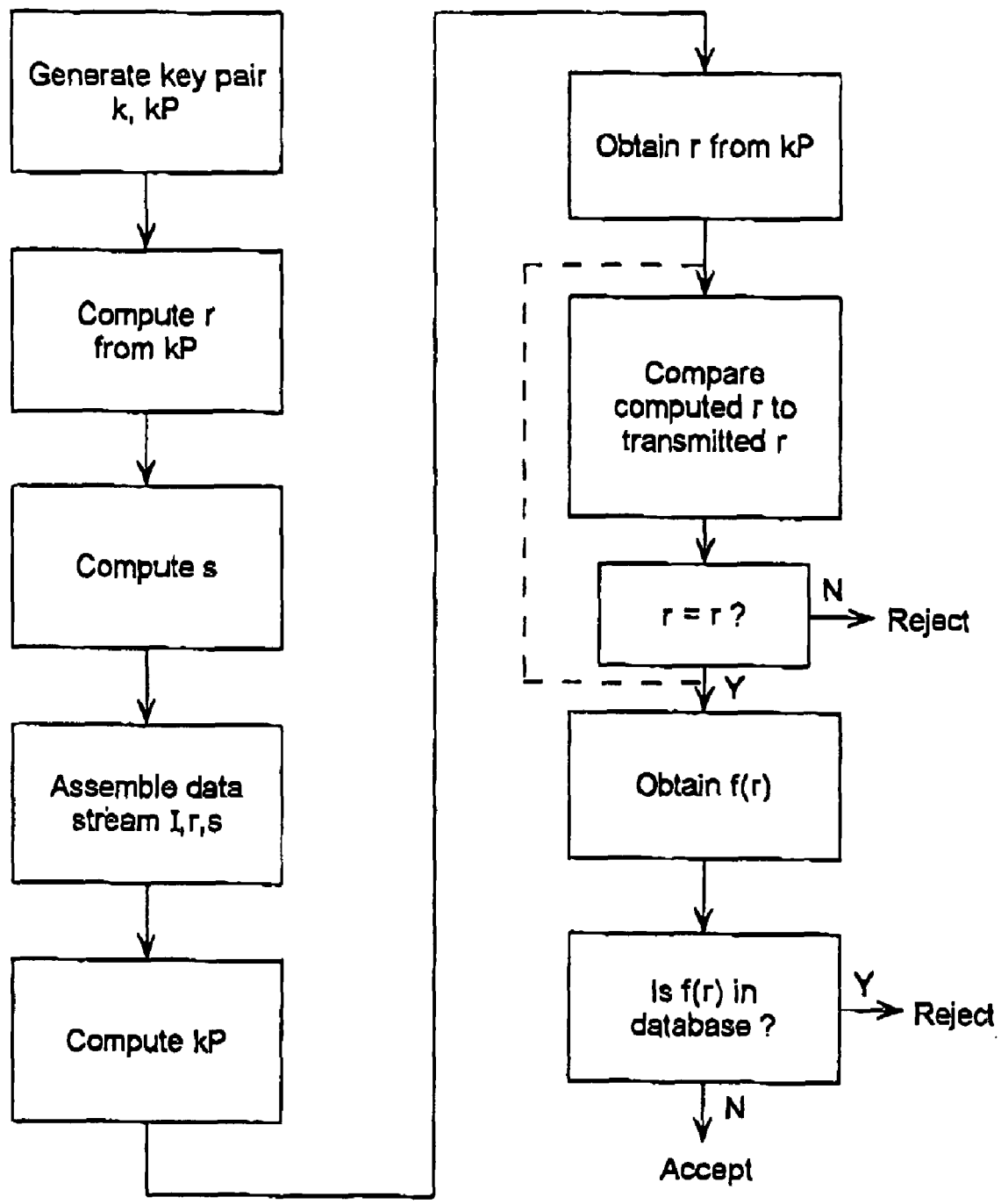
FIG. 4 is a detailed representation of the implementation with an ECDSA signature protocol.

An example of an established signature protocol that may be utilised to implement the above technique is described below with respect to FIG. 4 utilising the ECDSA signature protocol.

Information I is to be signed by a long term private key d of the correspondent 12 in an elliptic curve cryptosystem (ECC) with known parameters including a generating point P of order n:

The correspondent 12 randomly generates an ephemeral private key k and computes a corresponding ephemeral public kP which represents a point with coordinates (x,y).

To compute a first component r of the signature, the first co-ordinate of the ephemeral public key kP is converted into an integer. The first component is itself random as it is determined from the random private key k.

A second component s, of the signature is generated by solving the signing equation ks=H(I)+dr (mod n) for the second component s of the signature, where H is an appropriate cryptographic hash function such as SHA1.

The information and signature is assembled as a data stream 26 containing: (I,r,s) in defined locations and is then transmitted as the signed message 28 through the link 16:

Upon reception of the signed message 28, at the correspondent 14, the cryptographic processor 20 proceeds to authenticate the signature. The authentication normally proceeds as follows.

Initially the ephemeral public key kP is computed by calculating $s^{-1}(H(I)P+rA)$, where A is the long term public key of the correspondent 12.

After recovery of kP, the first co-ordinate of kP is converted into an integer following the same procedure as used by the correspondent 12. The integer obtained should correspond to the number r contained in the transmission and if so the signature is accepted. If it does not, the signature is not verified and so is rejected.

To inhibit a replay attack, a subset $f(r)$ of the number r is extracted or derived from the signed message 28. The subset $f(r)$ is compared with a previously stored list 24 of subsets in the database 22 for the correspondent 12. The database 22 is conveniently organised by correspondent for comparison. Well-known masking and shifting techniques may be used to extract and compare the bit streams efficiently. If only a replay attack is of concern, then it may be sufficient to compare the subsets received from the same correspondent but for greater security all previous subsets may be compared.

The authentication is rejected if the subset $f(r)$ is in the list, indicating it had previously been used. If the subset is not on the list 24, the process continues and the subset f(r) is added to the database 22 using well-known storage-and-retrieval techniques to store the data in such a manner as to allow subsequent efficient retrieval.

It will be appreciated that the signature verification may be performed after the comparison of the subsets if preferred. It will also be noted that the subset used to detect potential replay is part of the signature component r used for verification of the signature and as such already exists in the signed message. Accordingly, neither the bandwidth nor protocol are affected by the additional authentication and redundancy is avoided.

The number of bits chosen from the random component depends on the security level required for the application and the storage available. The number of bits chosen from the random component should also be large enough to give assurance against the Birthday Surprise, where the expected number of events that will occur before a match is calculated to be $\sqrt{2^m \pi}$ asymptotically, where m+1 bits are stored. For example, in storing 40 bits, one would not expect a match short of 1.3 million signatures; in storing 60 bits, one would not expect a match short of 1.3 billion signatures.

Figure 5:
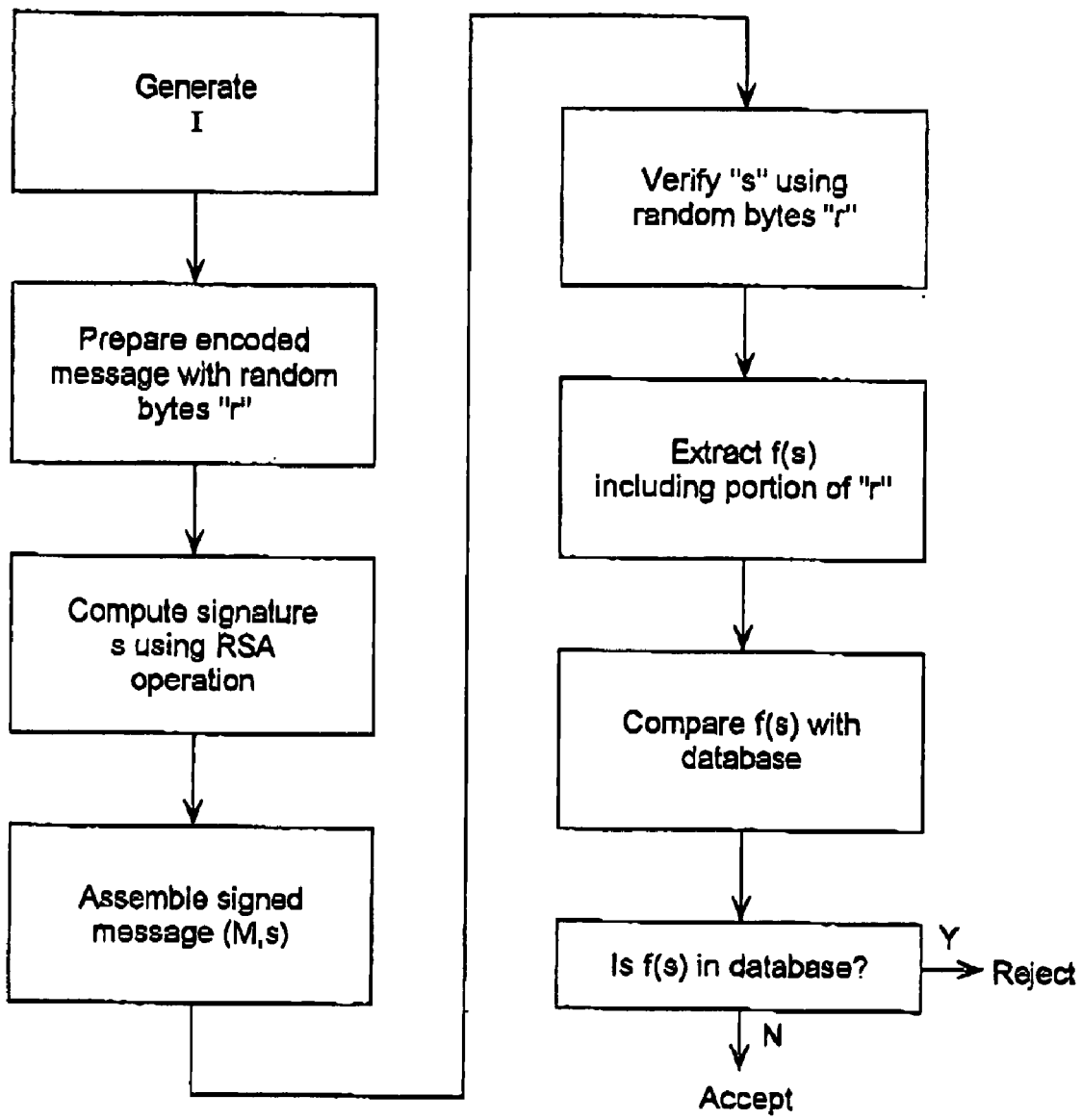
FIG. 5 is a representation similar to FIG. 4 applied to an RSA signature scheme.

In a second preferred embodiment shown in FIG. 5, the signature scheme is the well-known integer-factorisation scheme of RSA with appendix, RSA-PSS, as specified in PKCS #1, Ver. 2.1.

The information I is encoded as follows:
i) The information I is hashed, the hash is bracketed by prepending padding bytes and appending random bytes r, resulting in a bracketed hash E.
ii) The bracketed hash E is further hashed, resulting in the bit string H.
iii) The bit string H is used in a mask generation function, and the output of the function employed to mask the random bytes appended to the hash of the information I.
iv) The encoded message is assembled comprising the concatenation of the masked output from Step (iii), the further hash from Step (ii) i.e. the bit string H, and a padding byte.

The encoded message is then converted into a number. The RSA operation is performed on the number with the private exponent of the correspondent 12, and the result converted to a bit string s which is used as a signature, s for the information I.

The message with signature: (I,s) is then transmitted over the link 16 as a data stream 28 to correspondent 14.

Upon reception of the data stream (I,s), by the correspondent 14, the verification and authentication proceeds as follows.

At the cryptographic processor of correspondent 14, the signature s is converted into a number.

The RSA operation is then performed on the number with the public exponent of correspondent 12, resulting in another number which is converted into the alleged bracketed hash E.

The alleged bracketed hash E is hashed and split into the alleged masked output and the alleged hash of the original message.

Using the alleged masked output and the alleged hash, the alleged random bytes are extracted.

The concatenation of the appropriate padding, the hash of the alleged bracketed hash and the alleged random bytes is hashed and compared with the alleged hash of the original message. If the two agree, the signature is considered verified and accepted.

To inhibit a replay attack, either before or after verification, a subset $f(s)$ of the number s, is extracted, where $f$ is a predetermined function. The subset $f(s)$, is selected from the portion of the signature s that corresponds to the appended random bytes and compared with a previously stored list 24 of subsets for the correspondent 12 in the database 22.

The authentication is rejected if the subset is in the list. If it is not in the list, the signature is accepted and the subset to the list is added. Again therefore the reply attack is inhibited by use of the portion of the signature components that are random and used by the protocol in the signature verification.

The above examples have been described in the context of a signature verification but may also be used in other protocols where a random bit pattern is generated. For example, the MQV protocols may be used a key agreement protocol as well as signature protocols.

In the key agreement protocols, the ephemeral public key of each correspondent is exchanged and forms part of the message, The ephemeral public key is random and is used to authenticate the respective party. Accordingly, a subset of the data representing the key may be extracted and compared with the existing database to verify the originality of the exchanged message.

It will be appreciated that although in the above description the data base 22 is shown associated with the correspondent 14, a similar database may be associated with each correspondent in the system where protection from such attacks is required.

What is claimed is:

1. A method for a correspondent confirming originality and authenticity of a signed message generated and signed by another correspondent, the method comprising:
   said correspondent receiving from said other correspondent said signed message, said signed message comprising information and a signature signing said information;
   a cryptographic processor of said correspondent:
      performing a RSA operation on said signature and a public exponent of said other correspondent and converting a result of said RSA operation into an alleged bracketed hash E';
      hashing said alleged bracketed hash E' and splitting a hash result into an alleged masked output and an alleged hash of said information;
      extracting alleged random bytes from said alleged masked output and said alleged hash of said information; and,
      comparing said alleged hash of said information with a hash of said alleged bracketed hash and said alleged random bytes, and verifies said signature when said hash and said alleged hash of said information agree; and,
      confirming said verified signature when an extracted subset of said number does not match a previously stored list of subsets for said correspondent.

2. The method according to claim 1 wherein said previously stored list of subsets is maintained in a database one of said correspondent.

3. The method according claim 2 wherein when said extracted subset is not matched to said previously stored list of subsets, said method further comprises said correspondent adding said extracted subset to said database.

4. The method according to claim 1 wherein said previously stored list of subsets comprises bit patterns obtained from other correspondents.

5. The method according to claim 1 wherein said signature computed by said other correspondent comprises a result of a first RSA operation performed on an encoded message and a private exponent of said other correspondent, and said signed message comprises a combination of said encoded message and said signature.

6. A computing device comprising a processor and a memory, said computing device being connectable to a data communication system, and being configured to execute the method of claim 1.

7. A method for a correspondent confirming originality and authenticity of a signed message generated and signed by another correspondent, the method comprising:
   said correspondent receiving from said other correspondent said signed message, said signed message comprising information I, and a signature comprising a first signature component r, and a second signature component s;
   a cryptographic processor of said correspondent:
      computing an ephemeral public key kP by calculating $s^{-1}(H(I)P+rA)$, where k is a private key, P is a generating point of order n, H is a cryptographic hash function, and A is a long term public key of said other correspondent;
      converting a first co-ordinate of kP into an integer;
      comparing said first co-ordinate to said first signature component r for correspondence;
      extracting a subset $f(r)$ from said first signature component r;
      comparing said subset $f(r)$ with a list of subsets previously stored by said correspondent; and,
      verifying said signature when said first co-ordinate corresponds with said first signature component r, and accepting said verification when said subset $f(r)$ is not in the list.

8. The method according to claim 7 wherein said previously stored list of subsets is maintained in a database one of said correspondent.

9. The method according claim 8 wherein when said extracted subset is not matched to said previously stored list of subsets, said method further comprises said correspondent adding said extracted subset to said database.

10. The method according to claim 7 wherein said previously stored list of subsets comprises bit patterns obtained from other correspondents.

11. The method according to claim 7 wherein said signature computed by said other correspondent comprises a result of a ECDSA signature operation performed by solving a signing equation ks=H(I)+dr(mod n), where d is a long term private key of said correspondent.

12. A computing device comprising a processor and a memory, said computing device being connectable to a data communication system, and being configured to execute the method of claim 7.

* * * * *